United States Patent [19]

Buese et al.

[11] Patent Number: 5,330,836
[45] Date of Patent: Jul. 19, 1994

[54] FUNCTIONALIZED SILICA PARTICLE AND USE THEREOF FOR CROSS-LINKING SILICONES

[75] Inventors: Mark A. Buese, Upper Darby; Dana L. Poczynok, Newtown, both of Pa.

[73] Assignee: Temple University-Of The Common Commonwealth System of Higher Education, Philadelphia, Pa.

[21] Appl. No.: 940,103

[22] Filed: Sep. 3, 1992

[51] Int. Cl.$^5$ .................. B32B 5/16; C04B 14/04
[52] U.S. Cl. .................. 428/405; 428/406; 106/490
[58] Field of Search ............. 428/405, 406; 106/490

[56] References Cited

U.S. PATENT DOCUMENTS

| | | | |
|---|---|---|---|
| 2,938,009 | 5/1960 | Lucas | 260/37 |
| 3,021,297 | 2/1962 | George | 260/37 |
| 3,128,196 | 4/1964 | Pierpoint | 106/490 |
| 3,649,588 | 5/1972 | Kennedy-Skipton | 260/374 B |
| 3,654,215 | 4/1972 | Goossens | 260/37 |
| 3,700,473 | 10/1972 | Razzano et al. | 106/490 |
| 3,929,718 | 12/1975 | Kratel et al. | 260/375 B |
| 4,005,254 | 1/1977 | MacKenzie, Jr. | 523/212 |
| 4,191,587 | 3/1980 | Kratel et al. | 428/405 |
| 4,307,023 | 12/1981 | Ettlinger et al. | 260/375 B |
| 4,386,214 | 5/1983 | Behr | 549/34 |
| 4,387,222 | 6/1983 | Koshar | 528/21 |
| 4,423,197 | 12/1983 | Behr | 528/21 |
| 4,529,774 | 7/1985 | Evans et al. | 106/490 |
| 4,780,108 | 10/1988 | Razzano | 23/293 R |
| 5,057,151 | 10/1991 | Schuster et al. | 106/2 |

OTHER PUBLICATIONS

Sokolov et al., *Journal of General Chemistry of the USSR* 26, 1061-1063 (1956).

*Primary Examiner*—Melvyn I. Marquis
*Assistant Examiner*—Karen A. Dean
*Attorney, Agent, or Firm*—Seidel, Gonda, Lavorgna & Monaco

[57] ABSTRACT

Particulate fillers containing Si-OH groups are functionalized by treatment with a silica bonding agent. The treated particles are effectively polyfunctional, and may be used to prepare highly filled, cross-linked organopolysiloxane networks without the need for additional cross-linking agents. The functionalized particles are highly compatible with silicone fluids, particularly cyclosiloxane fluids. Compositions curable to such filled, cross-linked networks comprise the bonding agent-functionalized particles, a curable organopolysiloxane, and a catalyst for curing the organopolysiloxane.

11 Claims, No Drawings

FUNCTIONALIZED SILICA PARTICLE AND USE THEREOF FOR CROSS-LINKING SILICONES

FIELD OF THE INVENTION

The invention relates to the treatment of silica particles for incorporation into siloxane resins.

BACKGROUND OF THE INVENTION

Silane bonding agents have been used to treat silica fillers in a wide variety of resin systems to improve the adhesion of the resin matrix to the filler. In some cases, the bonding agent becomes part of the matrix. Typically, the bonding agent is an extension of a linear portion of the matrix chain, or a chain end. Such agents do not provide for cross-linking of the resin matrix.

U.S. Pat. Nos. 3,929,718 and 4,780,108 disclose treating silica particles with organosilicon compounds in order to increase the particles's density. The densified particles are used as fillers.

U.S. Pat. No. 2,938,009 describes filled organopolysiloxane compositions comprising a curable organopolysiloxane and filler particles coated with certain cyclic alkyl polysiloxanes.

U.S. Pat. No. 3,649,588 discloses treatment of fillers with low molecular weight organopolysiloxanes in the presence of an amino compound in order to render the filler hydrophobic and non-structure inducing. Hydrophobic filler mixtures for room temperature vulcanizable and low temperature vulcanizable silicone rubbers are disclosed in U.S. Pat. No. 4,307,023. The hydrophobizing agent is an organosilicone compound consisting of linear or cyclic organopolysiloxanes. Treatment of silica fillers with organosilicon compounds in order to render the filler hydrophobic is also taught in U.S. Pat. No. 5,057,151.

U.S. Pat. No. 3,654,215 discloses filler cross-linked polysiloxanes. This is accomplished by reacting a polysiloxane containing silanic hydrogen with a filler containing silanol groups in the presence of a platinum-containing catalyst. Cyclic dimethylsiloxanes and cyclic organosiloxanes containing silanic hydrogen are rearranged with alkaline or acid catalyst to give the desired curable organopolysiloxane.

U.S. Pat. No. 3,021,297 describes resins formed from chloromethylheptamethylcyclotetrasiloxane. The polymerized product, either with or without a filler, can be used for caulking.

Chloroheptamethylcyclotetrasiloxane was first prepared via chlorination of heptamethylcyclotetrasiloxane in CCl₄ in high yield (Sokolov et al., *J. Gen. Chem, U.S.S.R.* 26, 1061–1063 (1956), incorporated herein by reference). The synthesis proceeds in very high yield with few side reactions. The subsequent use of this reagent has not been reported.

SUMMARY OF THE INVENTION

It is an object of the invention to functionalize a particulate solid containing silanol groups with a cyclosiloxane bonding agent such that the particle may be used as a cross-linking filler in the preparation of silicone rubber or glass.

It is an object of the invention to provide for the preparation of silica filled rubbers without the need for additional cross-linking agents.

It is an object of the invention to provide filled networks which vary from lightly cross-linked rubbers to hard glasses.

It is an object of the invention to provide a silica filler which is compatible with cyclosiloxanes.

These and other objects of the invention will be apparent from the following disclosure.

In one embodiment, the invention is a process for preparing a polyfunctionalized filler for filler-cross-linked siloxanes. A silanol-containing filler is treated with a cyclosiloxane bonding agent to form such polyfunctionalized filler, which is then recovered. The bonding agent comprises at least one compound of the formula

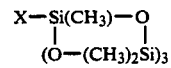

wherein X is
chlorine, bromine, or iodine;
the group —OR wherein R is $C_1$ to $C_8$ straight- or branched-chain alkyl or aryl, preferably $C_1$ to $C_4$ alkyl;
the group

wherein
$R^1$ is selected from the group consisting of hydrogen and $C_1$ to $C_6$ straight- or branched-chain alkyl, or
$R^1$ forms, together with the carbonyl carbon and nitrogen of said group, a ring containing from five to seven atoms;
the group

wherein
$R^2$ and $R^3$, same or different, are selected from the group consisting of hydrogen and $C_1$ to $C_6$ straight- or branched-chain alkyl, or
$R^2$ forms, together with the carbonyl carbon and nitrogen of said group, a ring containing from five to seven carbon atoms, and $R^3$ is $C_1$ to $C_6$ straight- or branched-chain alkyl;
the group $—NR^4R^5$ wherein
$R^4$ and $R^5$, same or different, are selected from the group consisting of hydrogen and $C_1$ to $C_8$ straight- or branched-chain alkyl or aryl; or
the group

wherein
$R^7$ is $C_1$ to $C_8$ straight- or branched-chain alkyl or aryl.

$R^1$, $R^2$ and $R^3$ are preferably methyl.

According to another embodiment, the invention is a polyfunctional filler particle adapted for the preparation of filler-crosslinked siloxane networks comprising a silanol-containing filler particle at least a portion of the available silanol groups of which have been converted to a moiety of the formula

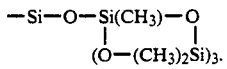

The invention is further directed to a composition curable to a filled, cross-linked siloxane network comprising the aforesaid functionalized particles, at least one curable organopolysiloxane, and a catalyst capable of curing the organopolysiloxane.

The invention further is a two-part resin combination comprising, in separate parts:

a first part comprising at least one curable organopolysiloxane and silanol-containing filler particles at least a portion of the available silanol groups on which have been converted to a moiety of the formula

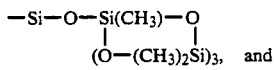

a second part comprising a catalyst effective for curing the organopolysiloxane.

DETAILED DESCRIPTION OF THE INVENTION

Silane bonding agents have been used in a wide variety of resin systems to improve the adhesion of the resin matrix to the filler. In most cases, the bonding agent is an extension of a linear portion of the chain or a chain end. According to the present invention, the site of attachment of the chains to the silica comprises a trifunctional unit as follows,

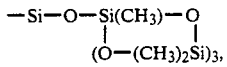

which results from the reaction of the silanol groups of the filler with the bonding agent. The preferred bonding agent is chloroheptamethylcyclotetrasiloxane. Since the thus-treated silica particles are effectively polyfunctional, the particles may be used to prepare silica filled cross-linked networks without the need for additional cross-linking agents. The treated particle acts not only as a filler particle to reinforce the cured composition, but also provides sites for cross-linking of the network. The functionalized particles are highly compatible with siloxane resins, particularly with cyclosiloxanes. Very highly filled networks are possible due to the compatibilization of the filler with the siloxane resin. The filled networks have properties which may vary from lightly crosslinked rubbers to hard glasses.

A filler particle, provided it contains silanol groups available for reaction with bonding agent, is easily functionalized by slurrying in a solution of the bonding agent. The resulting filler is highly functionalized, with most of the free silanol groups being converted to the trifunctional cyclic group shown above. These groups impart a high affinity for silicone and cyclosiloxane fluids.

The fillers used in the practice of the present invention comprise any particulate material having free silanol groups available for reaction. Such fillers include, for example, silica, particularly fumed silica; quartz; and barium glasses. Generally, the fillers will comprise silica fillers, which are well-known to those skilled in the art. Because of its purity and small particle size, the silica is preferably fumed silica.

The filler particles are preferably treated with the bonding agent in the presence of a dry aprotic solvent. The solvent may comprise, for example, hydrocarbons and aromatic hydrocarbons, in particular, alkanes such as pentane, hexane, heptane, octane, nonane, decane, and aromatic hydrocarbons such as benzene, toluene and xylene; chlorinated hydrocarbons, particularly chlorinated alkanes such as, for example, methylene chloride, chloroform, carbon tetrachloride, chlorobenzene and dichlorobenzene; ethers such as, for example, petroleum ether, diethyl ether, tetrahydrofurane and dioxane; and siloxanes such as, for example, octamethylcyclotetrasiloxane and hexamethylcyclotrisiloxane. The preferred solvents comprise hydrocarbons, chlorinated hydrocarbons and siloxanes. A particularly useful solvent is octamethylcyclotetrasiloxane.

The selection of the solvent depends on the nature of the leaving group X in the bonding agent. Where the leaving group is a halogen, the solvent preferably comprises an amine, which also functions as a catalyst and acid scavenger. Such amines include, for example, ammonia, primary amines and tertiary amines. Where the leaving group is an alkoxy, the solvent preferably comprises a catalyst for the displacement of the leaving group. Such a catalyst may comprise an acid or amine. The selection of the particular solvent/catalyst to suit the displacement of the particular leaving group X will be readily apparent to those skilled in the art.

The proportion of solvent, filler and bonding agent in the reaction mixture may vary, depending primarily on the choice of filler. The larger the filler particle size, the lower the amount of bonding agent required. The weight of filler in the reaction mixture is preferably from about 1 to about 50 wt. %, with from about 1 to about 20 wt. % being most preferred. Above 20% filler loading, the mixing of the reactants may be difficult. The amount of bonding agent ranges from about 1 to about 100% of the weight of filler employed in the reaction mixture, with from about 20 to about 50% being preferred. The balance of the reaction mixture comprises solvent. The weight ratio of filler to bonding agent in the reaction mixture is from about 100:1 to about 1:1, preferably from about 5:1 to about 2.1. The ratio of the weight of the solvent to the combined weight o f filler and bonding agent in the reaction mixture is from about 100:1 to about 1:1.

The reaction between the bonding agent and the filler particles can be easily monitored by gas chromatography. Either additional filler or additional bonding agent may be added to the reaction mixture after the initial reactant charge to optimize the consumption of bonding agent during the course of the reaction. In most cases, it is desirable to functionalize as many of the filler Si-OH sites as possible. Therefore, the filler can be added continuously until almost all of the bonding agent has disappeared from the chromatography trace.

A broad range of reaction times and temperatures may be used in the functionalization reaction. The reaction time is preferably from about 15 minutes to about 24 hours, with from about 30 minutes to about 24 hours being most preferred. The temperature is preferably within the range of from about 0° to about 100° C. with from about 20° to about 40° C. being most preferred. The reaction time and temperature are interrelated. The reaction time may be adjusted, depending upon the reaction temperature selected, and vice versa. Even at room temperature, the reaction is complete in less than 12 hours, as determined by gas chromatographic analysis. It should be noted that a gel may form if long reaction times and siloxane solvents are employed, due to the generation of HCl in the condensation reaction.

Generally, the functionalized filler particle must contain at least two trifunctional units

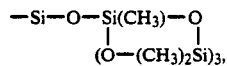

to be capable of acting as a cross-linking agent. In practice, the number of trifunctional units is much greater. One may control the amount of trifunctional units generated on the particle by controlling the proportion of filler and bonding agent added to the reaction mixture. The greater the amount of bonding agent added, the higher the functionality of the particle. The level of functionality will depend on the nature of the material desired. The higher the functionality, the more highly cross-linked and the harder the material for a given ratio of silicone to filler used in copolymerization formulations.

According to one embodiment, the bonding agent is prepared by reacting heptamethylcyclotetrasiloxane in a solvent with a reagent which will attach thereto a leaving group X, and the filler particle is functionalized by the addition of filler to the reaction product mixture. Thus, for example, chloroheptamethylcyclotetrasiloxane is prepared from heptamethylcyclotetrasiloxane, and the filler particle is functionalized by adding the filler to the chlorination reaction product mixture. After stripping of excess hydrochloric acid which is produced in the heptamethylcyclotetrasiloxane chlorination reaction, the functionalized filler particles are recovered. One particularly preferred solvent for this purpose is octamethylcyclotetrasiloxane.

The functionalized filler permits the incorporation of the particles into silicone fluids comprising redistributing siloxane systems wherein the filler becomes an integral part of the network. The network becomes cross-linked without the need for the inclusion of cross-linking agents other than the bonding agent-functionalized filler particles. In this manner, a room temperature vulcanizable rubber may be produced which consists only of curable organopolysiloxane, the filler, and a catalyst.

The organopolysiloxane may comprise any siloxane polymer convertible to a cured, solid state. Such materials are well-known to those skilled in the art. The particular organopolysiloxane chosen is not critical.

The term "organopolysiloxane" is inclusive of molecules which may be small enough to be denominated oligomers, and is inclusive of siloxane copolymers, including random, graft or block copolymers. By "copolymer" is meant to include not only copolymers per se, but also terpolymers and higher polymers. The siloxane polymer may have any functional groups attached to the silicone portion which are compatible with either an acid or a base catalyst. The siloxane copolymer structure may consist of random, block or graft polymers where the siloxane unit is either a disiloxane unit or a polysiloxane unit. The graft copolymers may have the potential for cross-linking if the backbone is the non-siloxane polymer and the grafts are siloxanes, provided there are multiple siloxane grafts per chain. The temperature at which this type of cross-linking can occur depends on the nature of the structure. The higher the glass transition temperature of the non-siloxane polymer, the higher the curing temperature.

Such siloxane copolymers include, for example, copolymers of siloxanes and polyimides, polyamides, polyesters, polycarbonates, polyamines, polyurethanes, polyureas, polyethers, polyalkylenes, polydienes, polystyrenes, polyacrylates and polymethacrylates. For the most part, the copolymers are copolymers of dimethylsiloxane, but may comprise copolymers of any specially functionalized siloxane unit, such as, for example, 3,3,3-trifluoropropyl-methyl-, phenylmethyl- and cyanopropylmethylsiloxane. According to one preferred embodiment, the curable organopolysiloxane comprises a polydimethylsiloxane resin, particularly resins comprising molecules of about 200 to about 1,000,000 dimethylsiloxy repeating units. According to another preferred embodiment, the organopolysiloxane comprises a cyclosiloxane, particularly a polydimethylcyclosiloxane. The number of dimethylsiloxy units depends upon the type of material being formed. A large number of repeating units is desired for forming a rubber. Where the curable organopolysiloxane is to be cured to a glass, it should contain few dimethylsiloxy units. A preferred range for the number of dimethylsiloxy units for preparation of a filled resin curable to a rubber would depend upon the amount of filler used and on the number of cyclosiloxane rings (i.e., heptamethylcylotetrasiloxyl moieties) bound to the particle surface. Once these parameters are established, those skilled in the art will be able to select organopolysiloxanes having an appropriate number of dimethylsiloxy repeating units.

For filled resins curable into hard glasses, the filler preferably comprises at least 50%, but no more than 85%, of the volume of the resin. Of the remaining volume, no more than 98%, preferably 50–90%, should comprise dimethylsiloxy units. To form hard glasses from such filled resins, curing should be carried out at a temperature of from about 25° C. to about 400° C. The particular temperature utilized depends upon the number of dimethylsiloxy repeating units. The greater the number of these units in the resin, the lower the curing temperature.

According to a most preferred embodiment, the siloxane polymer which is cured and cross-linked by the action of the functionalized filler comprises octamethylcyclotetrasiloxane, in the presence of a strong acid catalyst. Octamethylcyclotetrasiloxane is convenient to use since it has a low viscosity, and wets the filler more readily than does higher molecular weight polymers. The cyclic trifunctional group imparted to the filler effectively pre-wets the filler, enabling the preparation of low viscosity suspensions of filler particles in silicone fluids. The proportion of siloxane to filler, no matter whether the siloxane is a linear siloxane with few chain ends or a cyclic siloxane, determines the cross-linking density.

In yet another embodiment, the organopolysiloxane filled and cross-linked according to the present invention comprises one or more polycyclosiloxanes. Such polycyclosiloxanes include, for example, the various polycyclosiloxanes described in commonly assigned, co-pending application Ser. No. 915,487 filed Jul. 16, 1992, for "Highly Functionalized Polycyclosiloxanes and Their Polymerization into Thermally Reversible Living Rubbers", the entire disclosure of which is incorporated by reference. Such compounds include, for example: 1,3-di-(2-heptamethylcyclotetrasiloxane-yl-ethyl)-1,1,3,3-tetramethyldisiloxane, the preparation of which is disclosed by Andrianov et al., *Izv. Akad. Nauk SSSR. Ser. Kim.,* 9, 2055-8 (1975)); 1,2-bis-(heptamethylcyclotetrasiloxane-yl)-ethane, the preparation of which is disclosed in U.S Pat. No. 2,793,222 (Kantor et al.); bis-(heptamethylcyclotetrasiloxane-yl)-dimethylsilane; 1,3,5,7-tetra-(2-heptamethylcyclotetrasiloxane-yl-ethyl)-1,3,5,7-tetramethylcyclotetrasiloxane; 1,1,3,3-tetra-(2-heptamethylcyclotetrasiloxane-yl-ethyl)-1,3-dimethyldisiloxane; tris-(heptamethylcyclotetrasiloxane-yl)-methylsilane; hexa-(2-heptamethylcyclotetrasiloxane-yl-ethyl)-disiloxane; 1,3-di-{2-[tri-(2-heptamethylcyclotetrasiloxane-yl-ethyl)]-silylethyl}-1,1,3,3-tetramethyldisiloxane; tetrakis-(heptamethylcyclotetrasiloxane-yl)-silane; polydimethylsiloxanes which are end capped with: (2-heptamethylcyclotetrasiloxane-yl-ethyl)-dimethylsiloxy-, di-(2-heptamethylcyclotetrasiloxane-yl-ethyl)-methylsiloxy-, tri-(2-heptamethylcyclotetrasiloxane-yl-ethyl)-siloxy-, {2-[di-(2-heptamethylcyclotetrasiloxane-yl-ethyl)methylsilyl]-ethyl}-dimethylsiloxy-, {2-[tri-(2-heptamethylcyclotetrasiloxane-yl-ethyl)-silyl]-ethyl}-dimethylsiloxy-, bis-{2-[di-(2-heptamethylcyclotetrasiloxane-yl-ethyl)methylsilyl]-ethyl}-methylsiloxy-, bis-{2-[tri-(2-heptamethylcyclotetrasiloxane-yl-ethyl)silyl]-ethyl}-methylsiloxy-, tris-{2-[di-(2-heptamethylcyclotetrasiloxane-yl-ethyl)-methylsilyl]-ethyl}siloxy-; poly[(2-heptamethylcyclotetrasiloxane-yl-ethyl) methylsiloxane]; poly[di-(2-heptamethylcyclotetrasiloxane-yl-ethyl)siloxane]; poly[(2-heptamethylcyclotetrasiloxane-yl-ethyl)methylsiloxane-co-dimethylsiloxane]; and poly[di-2-heptamethylcyclotetrasiloxane-yl-ethyl)siloxane-co-dimethylsiloxane]. Particularly preferred are polycyclosiloxane fluids which have low viscosity but which are not volatile at room temperature.

The use of polycyclosiloxanes permits the preparation of sol-gel type glasses where the degree of shrinkage is very small, less than 2%, in comparison to traditional sol-gel glasses in which the degree of shrinkage is in excess of 20%. The quality of the resulting glass depends upon the temperature of cure. Higher temperatures, that is, temperatures in excess of 100 ° C., are advantageous. In conventional sol-gel systems, the substantial shrinkage, coupled with inhomogeneity of the cure, can result in stress and cracking of the glass.

The bonding agent-functionalized filler of the present invention may be incorporated into sol-glasses to a higher loading than untreated filler. The glasses are characterized by low shrinkage and diminished brittleness relative to glasses prepared using untreated fillers. Where a small polycyclic is employed as the glass-forming siloxane, it wets the bonding agent-functionalized filler. Once so wetted, the liquid polycyclosiloxane can be pressed from the polycyclosiloxane-filler mixture, resulting in a resin which is 55-75% filled.

In order to prepare filler cross-linked resins, the functionalized filler, curable organopolysiloxane and catalyst are combined under conditions appropriate for curing. Such conditions for the curing of liquid organopolysiloxanes into solid networks are known to those skilled in the art. Generally, the lower the molecular weight of the organopolysiloxane, the higher the amount of functionalized filler is required for effective cross-linking. Similarly, the greater the degree of functionalization of the filler, the less filler is required for cross-linking. The amount of filler in the cross-linking mixture generally comprises from about 1 to about 20 wt. %. Where the functionalized filler particle is represented by the formula

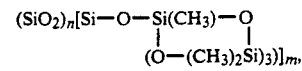

wherein $(SiO_2)_n$ is the molecular formula for glass and m is the number of trifunctional units per particle, the higher the ratio of n to m, the greater the amount of filler required to achieve cross-linking, and the greater the amount of filler that may be incorporated into the curable organopolysiloxane while still retaining elastomer behavior. The value of m must be at least 2. The maximum value of m depends on the size of the particle, the particle surface geometry and the number of SiOH groups on the surface.

Generally, only a very small amount of catalyst is used. Typically, the amount of catalyst will not exceed 1 wt. % of the mixture of organopolysiloxane-functionalized particle and catalyst. More preferably, the amount of catalyst is not more than about 0.5 wt. %. The more active the catalyst, the lower the amount of catalyst required. With the most active catalysts, from about 0.001 to about 0.025 wt. % is sufficient for curing. Of course, the greater the amount of catalyst employed, the greater the rate of cure. The catalyst may comprise any strong acid, including, for example, trifluoromethanesulfonic, trifluoroacetic, hexafluoroantimonic, hexafluorophosphoric, toluenesulfonic, hydrobromic, hydroiodic, sulfuric, hexachloroantimonic, hydrochloric and perchloric acid. Other very strong acids which may be used include, for example, nitrofluoromethylbenzenesulfonic, pentafluorobenzenesulfonic, nitrobenzenesulfonic, dinitrobenzenesulfonic, fluorobenzenesulfonic, nitrofluorobenzenesulfonic, nitrotrifluoromethylsulfonic and benzenedisulfonic acids.

The catalyst may alternatively comprise a base, such as, for example:

alkali hydroxides and fluorides such as NaOH, KOH, CsOH, NaF, KF and CsF;

alkali alkoxides such as $NaOR^1$, $KOR^1$ and $CsOR^1$; $NaOSi(R^2)_3$, $KOSi(R^2)_3$ and $CsOSi(R^2)_3$;

tetraalkylammonium hydroxides and fluorides such as $(R^5)_4NOH$ and $(R^5)_4NF$;

tetraalkylammoniUm alkoxides such as $(R^6)_4NOR^7$; $(R^8)_x(R^9)_y(R^{10})_z(R^{11})_w NOH$,
$(R^8)_x(R^9)_y(R^{10})_z(R^{11})_w NF$, and
$(R^8)_x(R^9)_y(R^{10})_z(R^{11})_w NOSi (R^{12})_4$;
$NaOSi(R^{13})_m(R^{14})_n(R^{15})_p$,
$(R^3)_4NOSi(R_{13})_m(R^{14})_n(R^{15})_p$, and
$(R^8)_x(R^9)_y(R^{10})_z(R^{11})_w NOSi(R^{13})_m(R^{14})_n(R^{15})_p$;
wherein:

$R^1$ and $R^7$ are selected from $C_1$ to $C_{20}$ alkyl;

$R^2$, $R^4$, $R^{12}$, $R^{13}$, $R^{14}$ and $R^{15}$ are selected from $C_1$ to $C_{20}$ alkyl, aryl or $—O[(Si(CH_3)_2]_i$; wherein i is from 1 to 1,000;

$R^3$, $R^5$, $R^6$, $R^8$, $R^9$, $R^{10}$ and $R^{11}$ are selected from $C_1$ to $C_{20}$ alkyl and aryl;

w, x, y and z are independently 0, 1, 2 or 3 wherein the sum of $w+x+y+z$ is equal to 4; and m, n and p are independently 0, 1 or 2 wherein the sum of $m+n+p$ is equal to 3.

According to one embodiment, the curable composition comprises a two-part resin wherein one part contains the functionalized filler and curable organopolysiloxane and the other part contains the catalyst. In this manner, curing and cross-linking occurs upon mixing the two parts. For systems where mixing immediately prior to use is not possible or desirable, latent catalysts may be utilized. Such latent catalysts are well known to those skilled in the art. They include, for example, moisture-activated initiators such as acid anhydrides, acid halides, phosphorous trihalides, phosphorous pentahalides and silylhalides or silylesters of strong acids. For moisture-initiated systems, a dry formulation of the components is prepared, and cure commences upon exposure to moist air as the hydrolysis of the initiator precedes to yield a strong acid. Depending upon the temperature of cure required, the resulting catalytically active species may be as weak as HCl or as strong as trifluoromethanesulfonic acid. Alternatively, cationic or nonionic photoinitiators known to those skilled in the art may be employed. The cationic photoinitiators include, for example, diaryliodonium salts and triarylsulfonium salts. The onium salts can photogenerate strong acids. Their photolysis involves the photogeneration of radicals and radical cations. Under appropriate conditions, these compounds may also be used as thermally activated initiators. Nonionic photoinitiators include, for example, 2-nitrobenzyl sulfonates, particularly the 2-nitrobenzyl sulfonate esters of strong acids, and derivatives, described by Houlihan et al., *Chemistry of Materials* 3, 462–471 (1991), incorporated herein by reference. For such 2-nitrobenzyl sulfonate-based photogenerators of acid, the acid is formed through the o-nitrobenzyl rearrangement (Horapool et al., *Synthetic Organic Photochemistry*, Plenum, New York, N.Y., 1984, p. 375), which is a photochemically induced intramolecular rearrangement in which no free radicals are produced in the main photochemical event. Methods for the curing of silicone fluids with moisture-activated initiators, or cationic or nonionic photoinitiators, are well-known to those skilled in the art. Generally, one-part systems will be acid-cured.

The practice of the present invention is illustrated in the following non-limiting examples.

EXAMPLE 1

A. Synthesis of Chloroheptamethylcyclotetrasiloxane

To a 1000 mL three-necked round bottom flask equipped with a magnetic stirring bar, a thermometer, an inlet for gases and an outlet fitted with a drying tube, was charged the following: 37.17 g (77.87 mmol) of heptamethylcyclotetrasiloxane (59.2% in octamethylcyclotetrasiloxane) and 521.9 g (5214 mmol) of heptane. The mixture was cooled in an ice bath to 0° C. Chlorine (Cl$_2$) was bubbled through the stirred mixture at a rate such that the temperature did not rise above 10° C. The addition of the chlorine was continued until a persistent yellow color, accompanied by a drop in temperature, was observed. Nitrogen gas was bubbled through the solution to remove the HCl generated in the reaction and the excess Cl$_2$. A yield of 100% under anhydrous conditions was determined by gas chromatographic analysis.

B. Alternative Synthesis of Chloroheptamethylcyclotetrasiloxane

To a 100 mL three-necked round bottom flask equipped with a magnetic bar, a thermometer, an inlet for gases and an outlet fitted with a drying tube, was charged the following: 5.0 g (15.0 mmol) of heptamethylcyclotetrasiloxane (84.9% in octamethylcyclotetrasiloxane) and 42.61 g (143.65 mmol) of octamethylcyclotetrasiloxane. The mixture was cooled in an ice bath to 18° C. Chlorine (Cl$_2$) was bubbled through the mixture at a rate such that the temperature did not rise above 25° C. The completion of the reaction was indicated by a persistent yellow color accompanied by a drop in temperature. Nitrogen gas was bubbled through the solution to remove the HCl generated and excess Cl$_2$. The yield was 100 % under anhydrous conditions.

C. Synthesis of Cyclosiloxane-Modified Silica

To the three-necked flask containing the chloroheptamethylcyclotetrasiloxane solution from A., above, was added 22.54 g of fumed silica (Aerosil-300) and the mixture stirred over night at 25° C. The reaction was followed by gas chromatography. The silica was filtered, washed with n-pentane and vacuum dried.

D. Analysis of Cyclosiloxane-Modified silica

The amount of cyclosiloxane chemically attached to the glass surface was determined by the following method. To a vial was charged 0.1174 g of the treated silica, 7.0531 g (43.43 mmol) of hexamethylsiloxane, 0.1583 g (0.929 mmol) of dodecane (internal standard) and trifluoromethanesulfonic acid (50 $\mu$L) as a catalyst. After 12 hours of mixing the catalyst was quenched with MgO and filtered. The filtrate was analyzed by gas chromatography. Three moles of octamethyltrisiloxane and one mole of tris-trimethylsiloxy-methylsilane resulted from each mole of heptamethyltetracyclosiloxane attached to the silica surface.

The gas chromatograpy data is consistent with the proposed structure for the trifunctional unit on the silica particle in which one siloxane silicon atom has three oxygen atoms and one carbon atom bound to it, and three other silicon atoms which have two oxygen atoms and two carbon atoms each bound thereto. Moreover, the addition of a known amount of dodecane has permitted the determination of the exact amount of the trifunctional cyclosiloxane units bound to the particle surface. This, in conjunction with the SiOH content of the silica filler reported by the manufacturer, enabled determination of the amount of possible sites of condensation which actually react. For Aerosil-300, which contains fumed silica particles of average diameter 7 nm and 1.5 mmol/g hydroxyl groups, the resulting functionalized particle contained 10.6 wt. % of the cyclosiloxane moiety (heptamethylcyclotetrasiloxyl) per particle, or 31 nmol % cyclosiloxane moiety, per hydroxyl group, per silica particle.

EXAMPLE 2

Silicone Networks From Cyclosiloxane-Modified Silica

A mixture of 0.10 g of the cyclosiloxane-modified Aerosil 300 according to Example 1, 3.00 g octamethylcyclotetrasiloxane and 2 $\mu$L of trifluoromethanesulfonic acid was prepared in a vial. The mixture gelled quickly. A piece of the rubber did not flow over a period of three months.

EXAMPLES 3-7

The procedure of Example 2 was repeated utilizing fumed silica particles of different diameters and hydroxyl equivalents. The results are set forth in Table 1:

TABLE 1

| Ex. | AERO-SIL | Diameter (nm) | OH Conc. (mmol/g) | % Weight Cyclo[1]/ silica | % mmol Cyclo/OH/- silica |
|---|---|---|---|---|---|
| 2 | A-300 | 7 | 1.5 | 10.6 | 28 |

TABLE 1-continued

| Ex. | AERO-SIL | Diameter (nm) | OH Conc. (mmol/g) | % Weight Cyclo[1]/ silica | % mmol Cyclo/OH/-silica |
|---|---|---|---|---|---|
| 3 | A-380 | 7 | 1.9 | 14 | 31 |
| 4 | A-200 | 12 | 1.0 | 7.0 | 27 |
| 5 | A-130 | 16 | 0.65 | 5.4 | 31 |
| 6 | A-90 | 20 | 0.45 | 4.2 | 34 |
| 7 | OX-50 | 40 | 0.25 | 2.0 | 29 |

[1]Cyclo = heptamethylcyclotetrasiloxyl moiety.

COMPARATIVE EXAMPLE NO. 8

To 0.54 grams of Aerosil-300 was added 15.83 grams of octamethylcyclotetrasiloxane. The mixture was refluxed for 5 hours at 168° C. To 11.70 grams of the mixture was added 0.3 grams of trifluoromethanesulfonic acid. The viscosity increased rapidly. After 24 hours, the mixture still flowed as a highly viscous liquid, unlike the octamethylcyclotetrasiloxane to which cyclosiloxane-modified silica particles were added according to Example 2.

EXAMPLE 9

A mixture of 0.665 grams of di(3-hydroxypropyl)hexamethylcyclotetrasiloxane, 0.035 grams of 4,4'-dimethyldiphenyliodonium trifluoromethane sulfonate, 0.512 grams of heptamethyltetrasiloxane-treated silica (Aerosil 200), and 1.85 grams of bis(heptamethylcyclotetrasiloxane-oxyl)silane was prepared. UV irradiation of this mixture, using a 450 watt 2.9 amp medium pressure mercury-vapor lamp, produced a gel in 15 minutes.

EXAMPLE 10

A highly silica filled glass network was made according to the following procedure: 2.34 grams of the mixture described in the previous example was placed in a modified stainless steel Buchner funnel. Approximately 1.6 grams of the liquid component of the mixture was filtered under pressure applied using a Carver press. The resulting paste contained about 50% of the treated silica. A hard material was produced after 10 minutes of UV irradiation, followed by heating to 115° C. for 10 minutes.

EXAMPLE 11

Synthesis of Cyclosiloxane-Modified Silica

To a 100 mL three-necked round bottom flask equipped with a magnetic stirring bar, a thermometer, an inlet for gases and an outlet fitted with a drying tube, was charged the following: 2.0 g of heptamethylcyclotetrasiloxane (36.7% in octamethylcyclotetrasiloxane) and 44.0 g of heptane. The mixture was cooled in an ice bath to 0° C. Chlorine (Cl$_2$) was bubbled through the stirred mixture at a rate such that the temperature did not rise above 10° C. The addition of the chlorine was continued until a persistent yellow color, accompanied by a drop in temperature, was observed. Nitrogen gas was bubbled through the solution to remove the HCl generated in the reaction and the excess Cl$_2$. Dimethylamine was bubbled through the stirred solution at 0° C., until the mixture tested basic to a wet pH paper. The excess amine was removed by bubbling nitrogen gas through the solution until the pH of the vapor tested neutral and no amine odor was detected. The dimethylammonium chloride salt was removed by gravity filtration. The resulting (dimethylamino)heptamethylcyclotetrasiloxane solution was transferred into a 25.0 ml flask which was charged with 1.0 g of fumed silica (Aerosil 300) and the silica was slurried overnight at room temperature. The chlorination, amination, and silanation reactions were followed by gas chromatography. The analysis of the cyclosiloxane modified silica indicated a 5% decrease in the (dimethylamino)heptamethylcyclotetrasiloxane concentration after 5 minutes. The treated silica was washed with n-pentane and vacuum dried. The amount of cyclosiloxane attached to the glass surface was determined following the method described in Example 1D. Results indicated that 7.7% by weight of heptamethylcyclotetrasiloxane was attached to the surface. A mixture of 0.1733 g of the treated silica and 4.8756 g of octamethylcyclotetrasiloxane was prepared and 0.0156 g of trifluoromethane sulfonic acid was added. The mixture quickly cured to a stable gel.

The present invention may be embodied in other specific forms without departing from the spirit or essential attributes thereof and, accordingly, reference should be made to the appended claims, rather than to the foregoing specification, as indicating the scope of the invention.

We claim:

1. A process for preparing a polyfunctionalized filler comprising
   treating a silanol-containing filler with a bonding agent comprising one or more compounds according to the formula

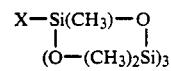

wherein X is
chlorine, bromine, or iodine;
the group —OR wherein R is C$_1$ to C$_8$ straight- or branched-chain alkyl or aryl, preferably C$_1$ to C$_4$ alkyl;
the group

wherein
R$^1$ is selected from the group consisting of hydrogen and C$_1$ to C$_6$ straight- or branched-chain alkyl, or
R$^1$ forms, together with the carbonyl carbon and nitrogen of said group, a ring containing from five to seven carbon atoms;
the group

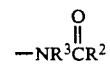

wherein
R$^2$ and R$^3$, same or different, are selected from the group consisting of hydrogen and C$_1$ to C$_6$ straight- or branched-chain alkyl, or
R$^2$ forms, together with the carbonyl carbon and nitrogen of said group, a ring containing from five to seven atoms, and R$^3$ is C$_1$ to C$_6$ straight- or branched-chain alkyl;
the group —NR$^4$R$^5$ wherein $R^4$ and $R^5$ same or different, are selected from the group consisting of hydrogen and $C_1$ to $C_8$ straight- or branched-chain alkyl or aryl; or the group $$-O\overset{O}{\underset{\|}{C}}R^7$$

wherein $R^7$ is $C_1$ to $C_8$ straight- or branched-chain alkyl or aryl;

to convert at least a portion of the silanol groups on the filler to a moiety of the formula $$-\underset{\underset{(O-(CH_3)_2Si)_3,}{|}}{Si}-O-\underset{\underset{|}{|}}{Si(CH_3)}-O$$

and recovering the polyfunctionalized filler.

2. A process according to claim 1 wherein the filler comprises silica, quartz or barium glass.

3. A process according to claim 1 comprising forming a mixture comprising the filler and bonding agent wherein the weight ratio of filler to bonding agent is from about 100:1 to about 1:1.

4. A process according to claim 1 wherein X is chlorine, bromine or iodine.

5. A process according to claim 3 wherein the weight ratio of filler to bonding agent is from about 5:1 to about 2:1.

6. A process according to claim 3 wherein the mixture of filler and bonding agent further comprises a dry aprotic solvent.

7. A process according to claim 6 wherein the ratio of the weight of the solvent to the combined weight of filler and bonding agent in the mixture is from about 100:1 to about 1:1.

8. A process according to claim 4 wherein the bonding agent is chloroheptamethylcyclotetrasiloxane.

9. A process according to claim 8 wherein the weight ratio of filler to chloroheptamethylcyclotetrasiloxane is from about 100:1 to about 1:1.

10. A process according to claim 9 wherein the weight ratio of filler to chloroheptamethylcyclotetrasiloxane is from about 5:1 to about 2:1.

11. Polyfunctional filler particle comprising a silanol-containing filler particle at least a portion of the available silanol groups of which have been converted to a moiety of the formula $$-\underset{\underset{(O-(CH_3)_2Si)_3.}{|}}{Si}-O-\underset{\underset{|}{|}}{Si(CH_3)}-O$$

* * * * *